Nov. 8, 1932.   J. Y. BLAZEK   1,887,478
BRAKE DRUM AND SHIELD ASSEMBLY
Filed April 8, 1931
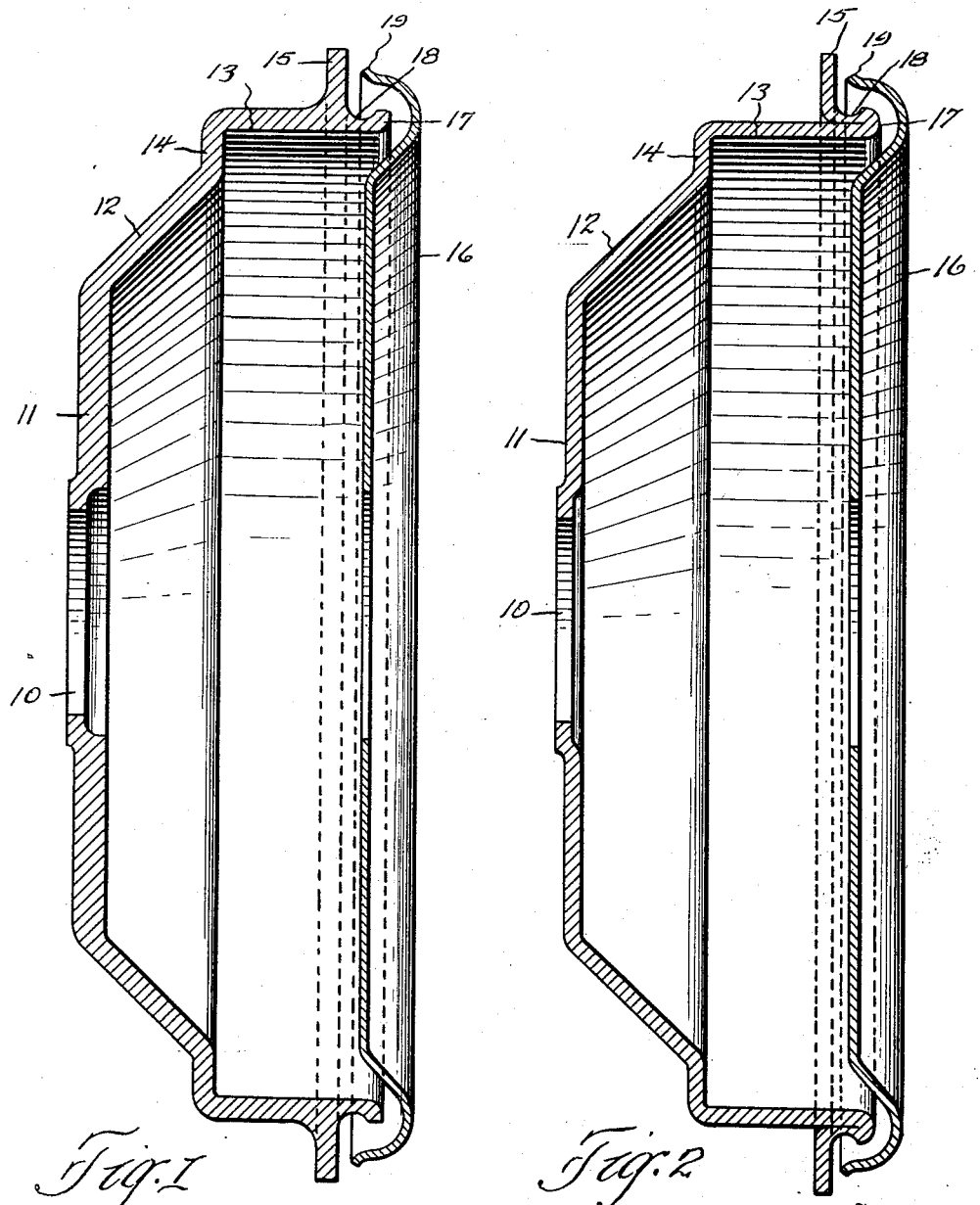
Inventor
John Y. Blazek
By Hull Brock + West
Attorney Patented Nov. 8, 1932

1,887,478

UNITED STATES PATENT OFFICE

JOHN Y. BLAZEK, OF CLEVELAND, OHIO, ASSIGNOR TO LEMPCO PRODUCTS, INC., OF MAPLE HEIGHTS, OHIO, A CORPORATION OF OHIO

BRAKE DRUM AND SHIELD ASSEMBLY

Application filed April 8, 1931. Serial No. 528,587.

This invention relates to a brake drum and shield assembly adaptable for use on vehicles, particularly automobiles, trucks and the like.

The principal object of this invention is to provide an improved assembly of this type which shall operate effectively to reduce to a minimum the amount of water which will find its way into the interior of the brake drum. The foregoing and other and more limited objects are attained in and through the invention, an illustrative embodiment of which is shown in the accompanying drawing and hereinafter described and claimed.

Fig. 1 is a central sectional view of a brake drum and shield assembly shown separated from the wheel and axle to which it will be normally attached and Fig. 2 is a similar view of a slightly modified form.

In the modification of Fig. 1, I have shown a cup-shaped brake drum member having an opening 10 for reception of an axle or spindle, a flat portion 11 for attachment to the wheel, an annular portion 12 spacing the braking portion 13 from the wheel and connected thereto by a short annular flat portion 14 serving as a strengthening means to impart rigidity to the end of the braking portion 13 nearest the wheel. The brake drum is also provided with a flat projection 15 adapted to serve the double function of bracing the other end of the braking portion 13 and cooperating with the shield member 16 to prevent or greatly reduce the ingress of water into the interior of the brake drum. The edge 17 of the brake drum beyond the reinforcing rib or projection 15 is provided with an external groove 18 adapted to collect water which may find its way between the rib or projection 15 and the periphery 19 of the shield member 16 and prevent the entry of the same into the interior of the brake drum, allowing it to run off by gravity or to be thrown off by centrifugal force if the vehicle is in motion.

It will be noted that the projection 15 extends slightly above the periphery 19 of the shield member. This prevents water or mud being thrown into the tortuous passages between the rib 15 and shield edge 19 as would be the case if the rib 15 did not so extend.

In the embodiment of Fig. 2, the structures are adapted for the same functions pointed out in connection with the embodiment just described and are given the same numerals. In Fig. 2, however, the construction is different in that the extreme edge of the brake drum member is folded back upon itself, as at 17 and bent outwardly to form the rib 15, the groove 18 being rolled or otherwise formed in the material thus bent back.

While I have shown and described certain illustrative embodiments of my invention, I wish it understood that I am not limited to the details thereof, but may carry out my invention in various forms within the scope of the appended claims.

Having thus described my invention, what I claim is:

1. A brake drum and shield assembly including, a cup-shaped drum member and a shield member having a peripheral groove into which the edge of said cup-shaped drum member extends and forming therewith a tortuous opening from inside to outside of said drum member, said drum being provided adjacent to but spaced from its edge with an upstanding projection extending outward of the periphery of said shield member and the extreme edge of said drum member being turned backwardly and outwardly to form said projection.

2. A brake drum and shield assembly including, a cup-shaped drum member and a shield member having a peripheral groove into which the edge of said cup-shaped drum member extends and forming therewith a tortuous opening from inside to outside of said drum member, said drum being turned backwardly and outwardly and provided with a groove on the outside thereof adjacent the edge.

In testimony whereof, I hereunto affix my signature.

JOHN Y. BLAZEK.